9825X
J. Cochran,
Fire Dog.
Patented July 1. 1836.
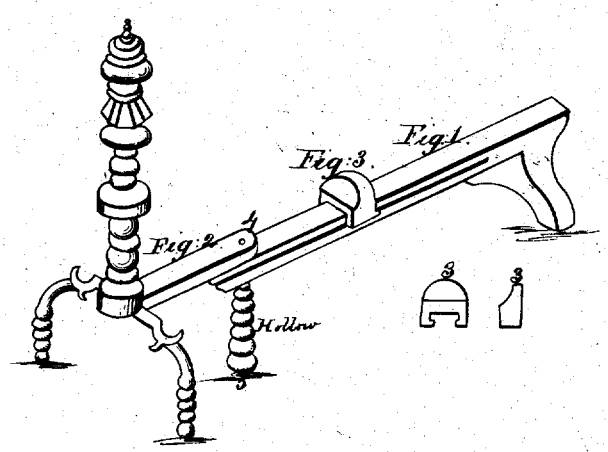

Av.

July 1, 1836 17.

James Cochran, of Batavia State of New York,

Letters Patent. 9825X

The schedule referred to in these Letters Patent & making part of the same, containing a description in the words of the said James Cochran himself of his Improvement in "And iron Bars"

To all to whom these presents shall come,

Be it known that I James Cochran of Batavia in the County of sunesee and State of New York, I have invented a new and useful improvement in Andiron bars; and that the following is a full and exact description thereof.

Fig 1 on draft a main bar of sufficient length and size of wrought or cast iron with three feet two at the backward sufficiently spread to keep the bar firm and steady. one at the outer end of the bar, made hollow, Fig 2, short bar made straight or circular of any suitable size or length, which may be cast on to the front standard screwed or rivetted to the same as circumstances may require the short bar being attached. The head pedistal and feet may be kept in their proper positions by a spike 4 in the back part of the short bar, made to fit into the hollow feet 5. in the front end of the main bar, from which the whole front part of the Andison may be easily disengaged for the purpose of cleaning, scouring, repairing or packing, Fig. 3, slide for the purpose of holding a rolling stick steady, sliding in a groove on each side of the main bar, about one forth of an inch in depth and half or two third the length of the bar, from the front end,

What I claim as my own invention and not previously known in the above described improvement is a bar so [illegible] that the front part may be desengaged for the purpose

9825X of cleaning and sweeping without disturbing that part which supports the wood for a fire. also a slide for the purpose of keeping the wood steady moving back and forward in a groove also by making the hole in the forward foot largest at the bottom and the strike smallest at the bottom, giving sufficient Room for play that all the feet may adjust themselves to an uneven hearth also relieving the front feet, from the usual weight and expense of common Andirons Witnesses
Benj F. Hays
David H. Chandler James Cochran

[illegible]

444 [illegible]

Drawing